United States Patent
Welsh

(10) Patent No.: US 6,981,737 B2
(45) Date of Patent: Jan. 3, 2006

(54) DOUBLE PLATE HEATER PIPE SEAL TO DASH

(75) Inventor: Gerard Welsh, Rochester Hills, MI (US)

(73) Assignee: Denso International America, Inc., Southfield, MI (US)

( * ) Notice: Subject to any disclaimer, the term of this patent is extended or adjusted under 35 U.S.C. 154(b) by 223 days.

(21) Appl. No.: 10/722,624

(22) Filed: Nov. 26, 2003

(65) Prior Publication Data

US 2005/0109885 A1 May 26, 2005

(51) Int. Cl.
*B60J 7/00* (2006.01)

(52) U.S. Cl. .............. 296/208; 296/39.3; 296/187.02

(58) Field of Classification Search ............... 248/694, 248/56; 180/90; 296/208, 39.3, 187.02, 296/72; 181/207, 290, 204, 210
See application file for complete search history.

(56) References Cited

U.S. PATENT DOCUMENTS

| | | | | |
|---|---|---|---|---|
| 4,655,496 A | * | 4/1987 | Gahlau et al. | 296/39.3 |
| 4,800,984 A | * | 1/1989 | Kerman | 181/290 |
| 4,825,974 A | * | 5/1989 | Hoffmann et al. | 181/290 |
| 2002/0008399 A1 | * | 1/2002 | Yasuta et al. | 296/72 |
| 2003/0159880 A1 | * | 8/2003 | Blomeling et al. | 181/204 |

FOREIGN PATENT DOCUMENTS

| | | | |
|---|---|---|---|
| DE | 43 06 397 A1 | * | 9/1993 |
| DE | 100 18 070 | | 10/2001 |
| FR | 2 782 295 | | 2/2000 |
| FR | 2 833 909 | | 6/2003 |
| JP | 01 289714 | | 11/1989 |

* cited by examiner

*Primary Examiner*—Ramon O Ramirez
(74) *Attorney, Agent, or Firm*—Harness, Dickey & Pierce, PLC

(57) ABSTRACT

A mounting arrangement for accepting a pipe through a boundary in a vehicle includes a dash defining a boundary between an engine compartment and a passenger compartment. A dash mat is disposed adjacent to the dash. A pipe extends through the dash between the engine compartment and the passenger compartment. A first mounting plate is positioned in the passenger compartment and accepts the pipe through a passage therein. A noise abating material is disposed between the dash and the mounting plate. The noise abating material contacts an outer circumferential surface of the pipe and overlaps a portion of the dash mat in an assembled position.

19 Claims, 4 Drawing Sheets

US 6,981,737 B2

DOUBLE PLATE HEATER PIPE SEAL TO DASH

FIELD OF THE INVENTION

The present invention relates to a heater pipe assembly in cooperation with a vehicle dash, and more specifically to a mounting plate assembly cooperating with noise abating material to reduce dash pass through noise levels.

BACKGROUND OF THE INVENTION

A vehicle HVAC system typically includes a heater core positioned in an engine compartment on an opposite side of a firewall or dash from the passenger. In a conventional configuration, a pair of heater pipes or tubes extend from the heater core and an HVAC case through a passage in the dash to mate with appropriate delivery hardware in the passenger compartment. The pipes usually comprise stainless steel, plastic or rubber.

A seal is generally provided in the heater pipe assembly between the heater pipes and the dash. The seal is typically designed to prevent water intrusion from the engine compartment to the passenger compartment. The seal generally is not independently held to the dash. During assembly, proper seal orientation relies on fore/aft positioning of the HVAC case with respect to the dash.

While conventional seal configurations for a dash mounted HVAC unit provide an adequate seal between the engine compartment and the passenger compartment for water intrusion purposes, they offer minimal noise reduction capability.

SUMMARY OF THE INVENTION

A mounting arrangement for accepting a pipe through a boundary in a vehicle includes a dash defining a boundary between an engine compartment and a passenger compartment. A dash mat is disposed adjacent to the dash. A pipe extends through the dash between the engine compartment and the passenger compartment. A first mounting plate is positioned in the passenger compartment and accepts the pipe through a passage therein. A noise abating material is disposed between the dash and the mounting plate. The noise abating material contacts an outer circumferential surface of the pipe and overlaps a portion of the dash mat in an assembled position.

In other features, the passage includes a clearance greater than the outer circumferential surface of the pipe. The pipe extends through the passage without contacting the first mounting plate in the assembled position. A second mounting plate is positioned in the engine compartment and accepts the pipe through a passage therein, the passage having a clearance greater than the outer circumferential surface of the pipe. The pipe extends through the passage without contacting the second mounting plate in the assembled position. A noise abating material is disposed between the dash and the second mounting plate. The noise abating material contacts the outer circumferential surface of the pipe is the assembled position.

A mounting arrangement for accepting heater pipes through a vehicle dash includes a dash defining a boundary between an engine compartment and a passenger compartment. The dash includes an opening incorporated in a planar portion for accepting the heater pipes. A step portion extends at an angle from the planar portion. A flange extends from the step portion and is laterally offset toward the passenger compartment. A dash mat contacts the planar portion, the step portion and the flange portion. A first mounting plate contacts the flange of the dash. A noise abating material is disposed between the dash and the first mounting plate. The noise abating material contacts an outer circumferential surface of the heater pipes and the step portion of the dash. The dash mat and the first noise abating material overlap at the step portion.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
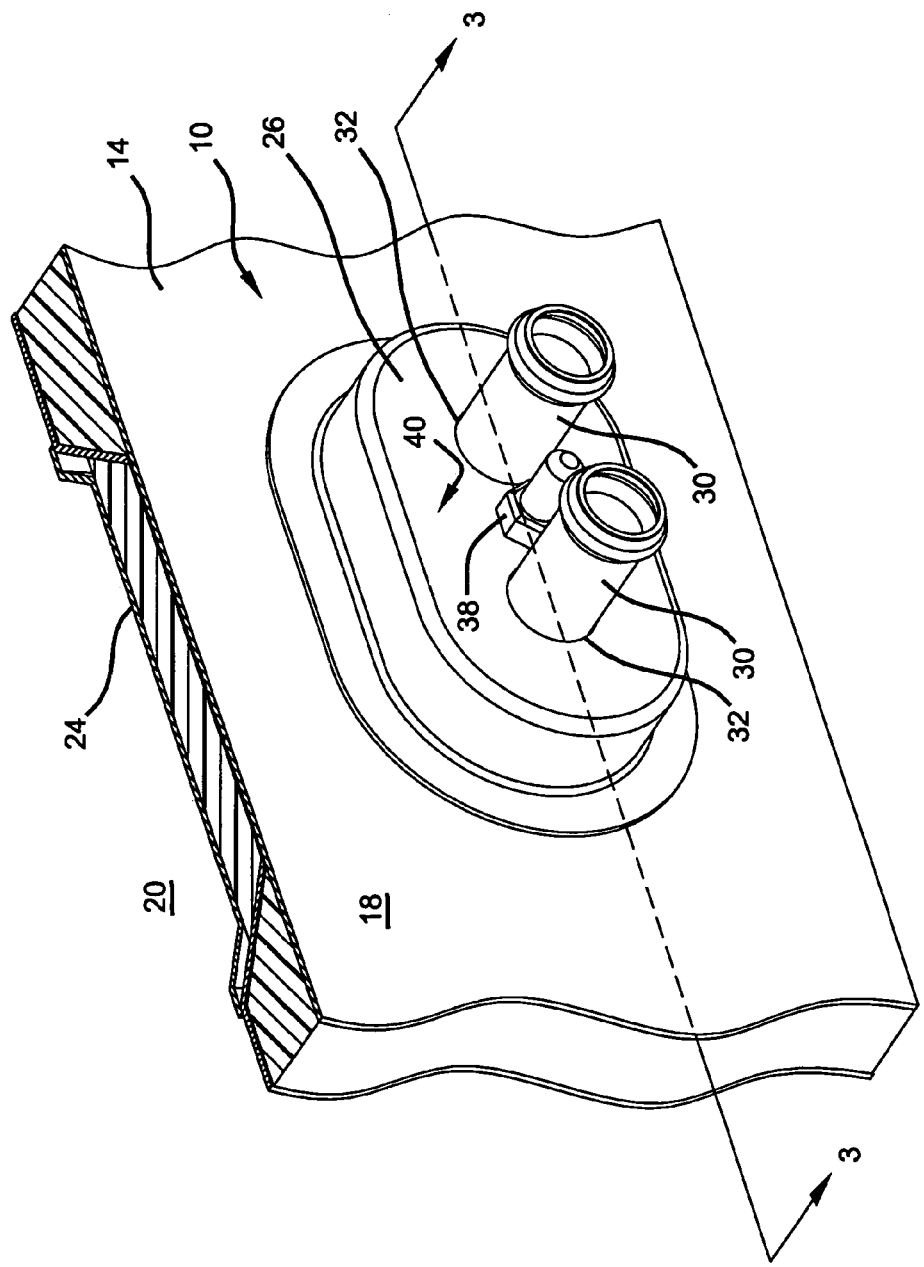
FIG. 1 is a perspective view of the heater pipe assembly shown in an installed position.
Figure 2:
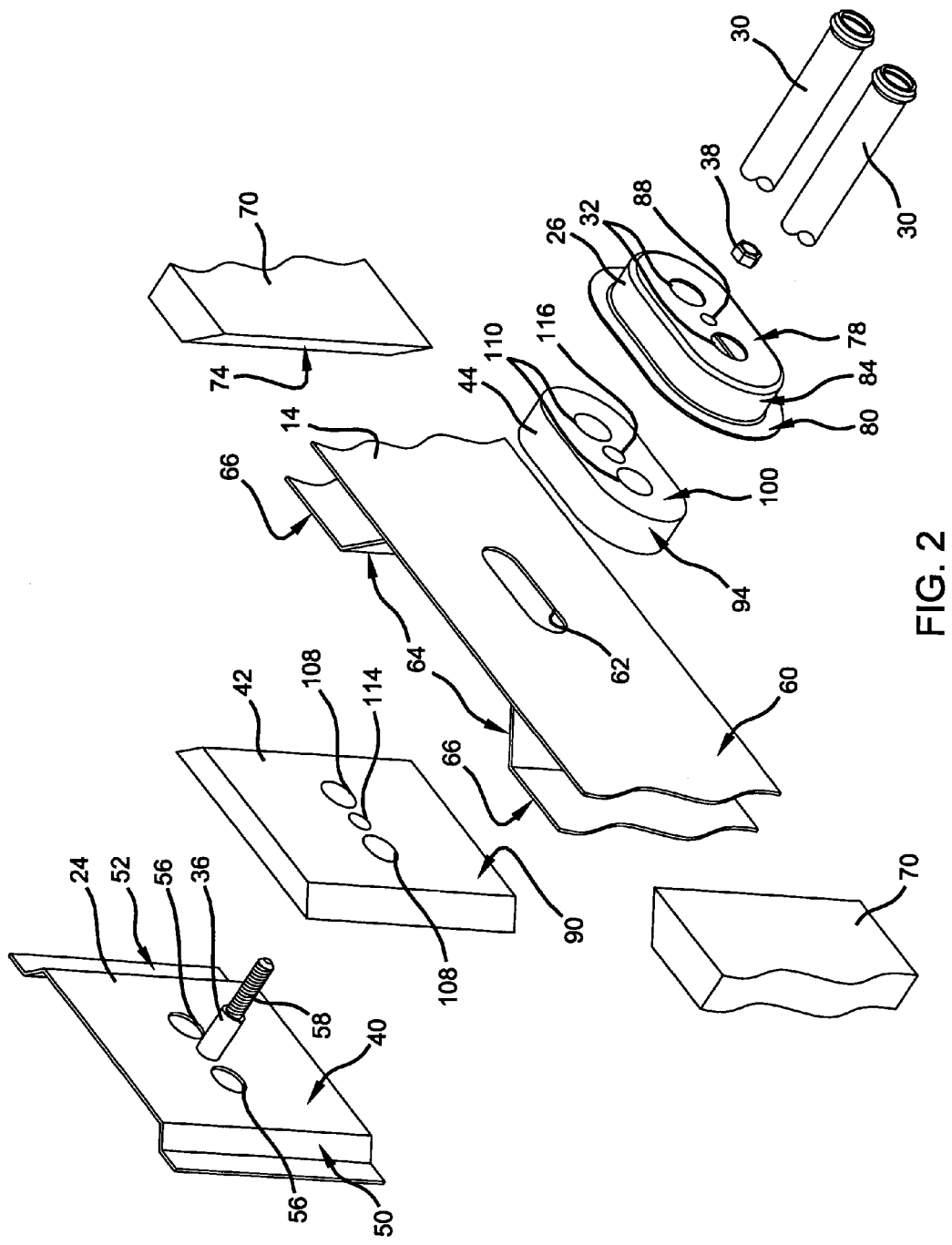
FIG. 2 is an exploded view of the heater pipe assembly.

With initial reference to FIGS. 1 and 2, a heater pipe assembly according to the present invention is illustrated and generally identified at reference 10. The heater pipe assembly 10 is shown in an assembled position in FIG. 1 operably coupled to a vehicle firewall or dash 14. The vehicle dash 14 defines a boundary between an engine compartment 18 and a passenger compartment 20. The heater pipe assembly 10 generally includes a first mounting plate 24 disposed in the passenger compartment 20 and a second mounting plate 26 disposed in the engine compartment 18. The first and second mounting plate 24, 26 cooperate to receive heater pipes 30 through passages 32 incorporated therein in the assembled position. A fastener or stud 36 extends from the first mounting plate 24 and is received by a nut 38 on an outboard surface 40 of the second mounting plate 26 for capturing the assembly 10 in the assembled position. It is appreciated that other fastening configurations may be employed between the first mounting plate 24 and the second mounting plate 26.

With specific reference to FIG. 2, the heater pipe assembly 10 will be described in greater detail. A first noise abating material 42 is disposed between the first mounting plate 24 and the dash 14. A second noise abating material 44 is disposed between the second mounting plate 26 and the dash 14. The first and second noise abating material 42, 44 preferably comprise a compliant material such as foam. As will be described, the first and second noise abating material 42, 44 contact respective outer circumferential surfaces of the pipes 30 to reduce noise passthrough from the engine compartment 18 to the passenger compartment 20.

Figure 3:
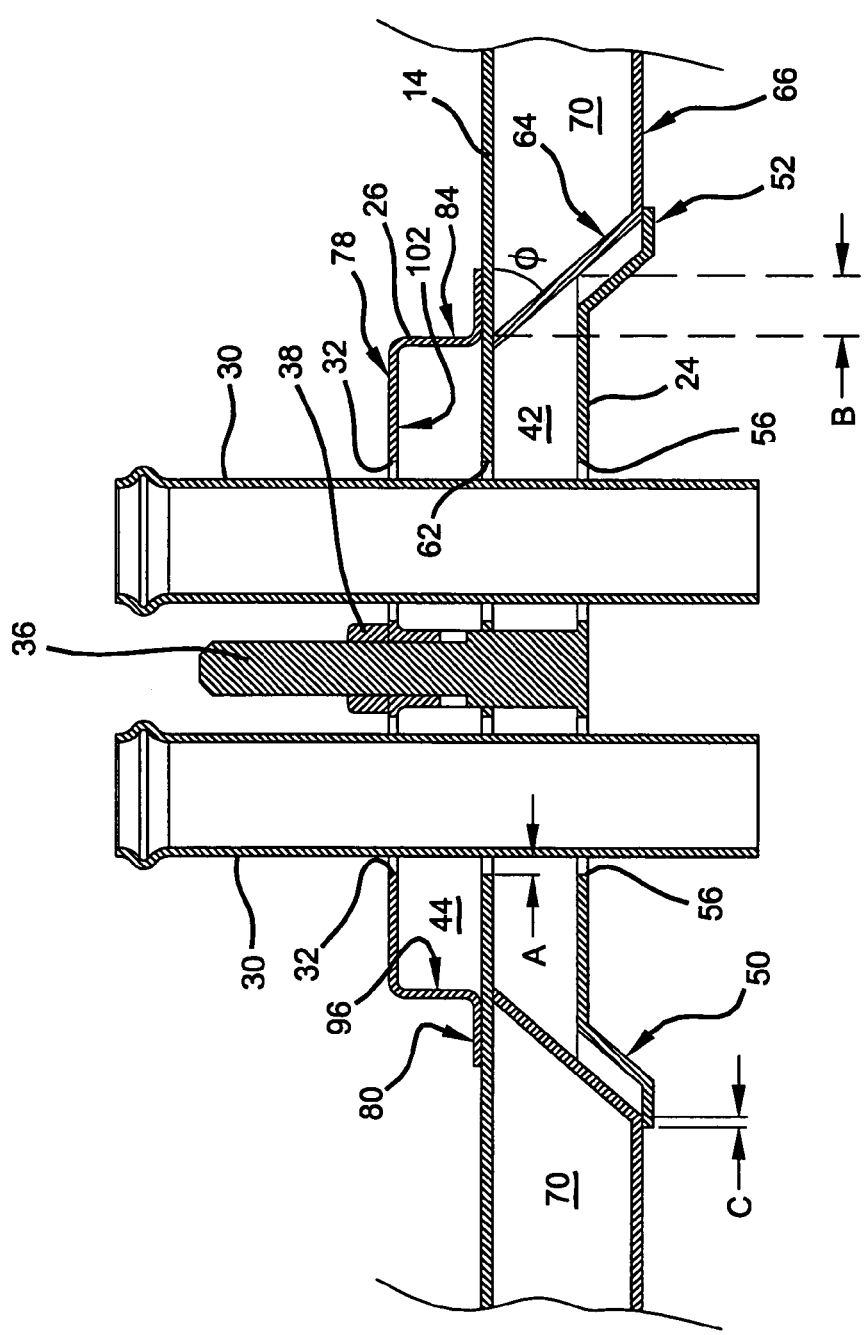
FIG. 3 is a cross sectional view of the heater pipe assembly taken along line 3—3 of FIG. 1.

With reference now to FIGS. 1–3, the first mounting plate 24 includes a planar portion 48 having step portions 50 on opposite sides extending toward the passenger compartment 20. The step portions 50 lead into respective flange portions 52. The flange portions 52 preferably extend parallel to the planar portion 48. A pair of passages 56 are formed in the first mounting plate 24 to accept the pipes 30. The passages 56 have a diameter greater than the pipes 30 to allow a gap A (FIG. 3) between the pipes 30 and the first mounting plate 24 in the assembled position. The gap A precludes vibration between the pipes 30 and the first mounting plate 24 which diminishes noise passthrough into the passenger compartment 20. The stud 36 is offset between the passages 56 and includes a threaded portion 58 on a distal portion for mating with the nut 38.

The dash 14 will now be described in greater detail. The dash 14 generally includes a planar portion 60 having an opening 62 incorporated therein. Although opening 62 is represented in the drawings as a single oval, other configurations are contemplated such as three distinct passages as described with respect to the first and second noise abating material 42 and 44. Step portions 64 extend on opposite sides of the opening 62 toward the passenger compartment 20. As most clearly shown in FIG. 3, the step portions 64 extend at an angle φ with respect to the planar portion 60 of the dash 14. The angle φ creates an overlap relationship (distance B) between the dash mat 70 and the first noise abating material 42. The overlap B inhibits noise passthrough from the engine compartment 18 to the passenger compartment 20. Flange portions 66 extend from the step portions 64 and are generally parallel to the planar portion 60. A dash mat 70 is disposed between the flange portions 68 and the planar portion 60. Preferably, an inboard surface 74 of the dash mat 70 abuts the step portions 64 of the dash 14.

The second mounting plate 26 includes a planar face 78 connected and laterally offset to a shoulder portion 80 by a neck 84. The neck 84 offsets the planar face 78 from the shoulder portion 80 a sufficient distance to accommodate the second noise abating material 44 therein. The passages 32 are arranged on the planar face 78 to accommodate the pipes 30. As with the first mounting plate 24, the passages 32 have a diameter greater than the pipes 30 to allow a gap between the pipes 30 and the second mounting plate 26 in the assembled position. The gap precludes vibration between the pipes 30 and the second mounting plate 26 which diminishes noise translation from the pipes 30 to the dash 14 and ultimately to the passenger compartment 20. A central hole 88 is arranged between the passages 32 to accept the stud 36.

The noise abating material 42 and 44 are configured to compress a predetermined amount during assembly. The first noise abating material 42 is bounded on its upright faces 90 by the respective planar portions 48 and 60 of the first mounting plate 24 and the dash 14. The step portions 64 of the dash 14 bound opposite sides of the first noise abating material 42. An outer radial surface 94 of the second noise abating material 44 is bound by an inner radial surface 96 (FIG. 3) of the neck 84 of the second mounting plate 26. The upright faces 100 of the second noise abating material 44 are bound by the inboard surface 102 (FIG. 3) of the planar face 78 of the second mounting plate 26 and the planar face 60 of the dash 14.

The first noise abating material 42 includes a pair of holes 108 therein for accepting the pipes 30. Likewise, the second noise abating material 44 includes a pair of holes 110 for accepting the pipes 30. Each noise abating material 42 and 44 includes a central hole 114 and 116 respectively for accommodating the stud 36. During assembly, the first and second noise abating material 42 and 44 are compressed within respective boundaries. The compression encourages tight contact between respective boundaries as well as tight contact with the outer circumferential walls of each pipe 30. The preferred compression ratio of the first and second noise abating material 42, 44 is between 30% and 60% reduction. It is appreciated that other compression ratios may be employed.

Figure 4:
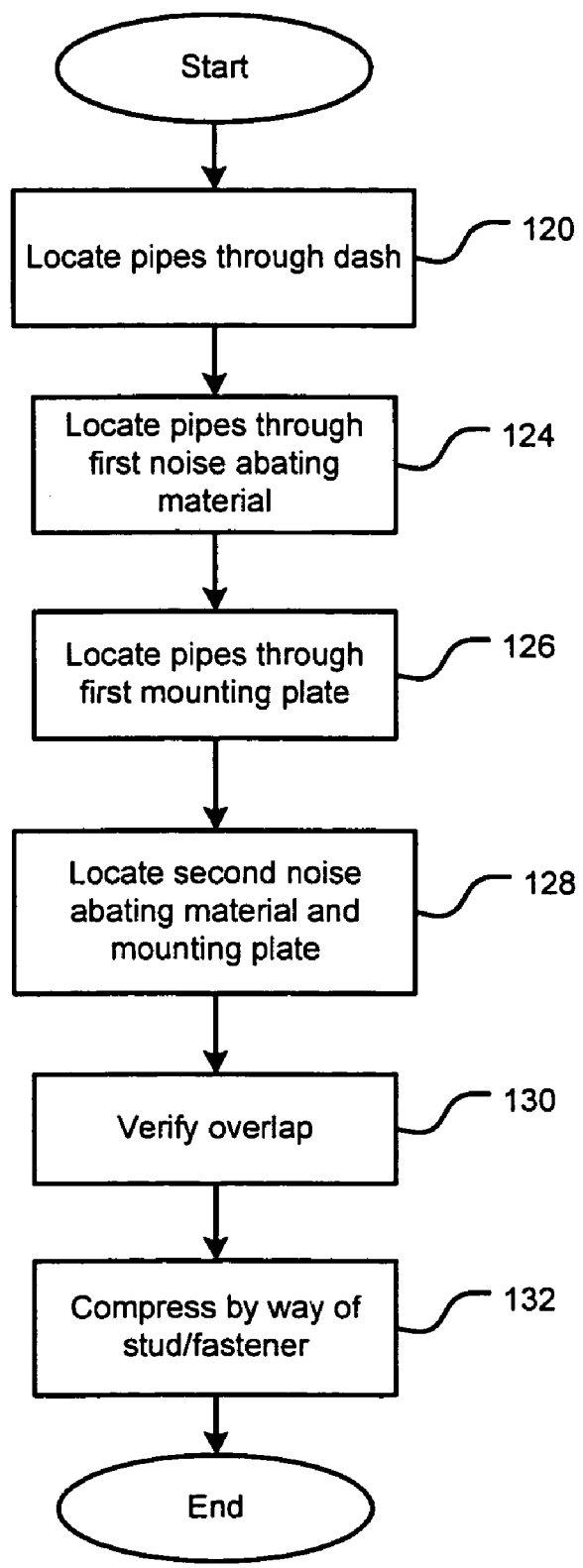
FIG. 4 is a flowchart illustrating steps for assembling the heater pipe assembly.

With particular reference to FIGS. 3 and 4, mounting the heater pipe assembly 10 into an installed position with the dash 14 will be described. In step 120 the pipes 30 are located through the opening 62 in the dash 14. In step 124 the pipes 30 are located through the passages 108 in the first noise abating material 42. In step 126, the pipes 30 are located through the passages 56 in the first mounting plate 24. In step 128 the second noise abating material 44 and mounting plate 26 are located around the pipes 30. In step 130 an overlap distance C (FIG. 3) is verified between the flange 52 of the first mounting plate 24 and the flange 66 of the dash 14. The opening 62 in the dash 14 is configured to have sufficient clearance (gap A) with the heater pipes 30 such that the pipes 30 remain untouched by the dash 14 in an assembled position.

During assembly, the first mounting plate 24 and the pipes 30 have a predetermined range of allowable lateral movement with respect to the dash 14. The overlap distance C is sufficiently small enough to ensure the pipes 30 have clearance from the dash 14 (gap A). Explained further, one of the flanges 52 of the first mounting plate 24 will fall off the respective flange 66 of the dash 14 if shifted beyond a predetermined lateral amount. The predetermined amount ensures that the first mounting plate 24 will fall off the dash 14 prior to the dash 14 touching one of the pipes 30 indicating improper installation. In this way, if any overlap C is achieved during installation, a clearance (gap A) is also achieved verifying the pipes 30 are untouched by the dash 14. In step 132 the heater pipe assembly 10 is tightened to the installed position by way of the stud 36 and fastener 38. The stud 36 and the fastener 38 may alternatively comprise other fastening mechanisms. It is appreciated that the order of assembly is exemplary. For instance, the second mounting plate 26 and second noise abating material 44 may be positioned with respect to the pipes 30 prior to the first mounting plate 24 and the first noise abating material 42.

Those skilled in the art can now appreciate from the foregoing description that the broad teachings of the present invention can be implemented in a variety of forms. For example, while the present invention has been described herein for use with a heater pipe assembly in an automobile, the same may be employed for a pipe, or other communication medium, extending between a boundary separating a first compartment with a second compartment having a noise source. Therefore, while this invention has been described in connection with particular examples thereof, the true scope of the invention should not be so limited since other modifications will become apparent to the skilled practitioner upon a study of the drawings, the specification and the following claims.

What is claimed is:

1. A mounting arrangement for accepting a pipe through a boundary in a vehicle comprising:
   a dash defining a boundary between an engine compartment and a passenger compartment;
   a dash mat disposed adjacent to said dash;
   a pipe extending through said dash between said engine compartment and said passenger compartment;

a first mounting plate positioned in said passenger compartment and accepting said pipe through a passage therein; and a noise abating material disposed between said dash and said mounting plate, said noise abating material contacting an outer circumferential surface of said pipe and overlapping a portion of said dash mat in an assembled position.

2. The mounting arrangement of claim 1 wherein said passage includes a clearance greater than said outer circumferential surface of said pipe wherein said pipe extends through said passage without contacting said first mounting plate in said assembled position.

3. The mounting arrangement of claim 1 wherein said pipe extends through an opening incorporated on said dash, said opening having a clearance greater than said outer circumferential surface of said pipe wherein said pipe extends through said opening without contacting said dash in said assembled position.

4. The mounting arrangement of claim 3 wherein said dash comprises:

a planar portion having said opening incorporated therein;

a first and second step portion extending from said planar portion toward said passenger compartment; and a first and second flange portion extending from said respective first and second step portion, said first and second flange portion extending away from said pipe and substantially parallel to said planar portion.

5. The mounting arrangement of claim 4 wherein said first and second step portion contact said first noise abating material on an inboard side.

6. The mounting arrangement of claim 5 wherein said dash mat is disposed between said planar portion of said dash and respective first and second flange portions.

7. The mounting arrangement of claim 4 wherein said first mounting plate comprises:

a planar portion having said passage incorporated therein;

a first and second step portion extending from said planar portion toward said passenger compartment; and a first and second flange portion extending from said respective first and second step portion, said first and second flange portion extending away from said pipe and overlapping a portion of said first and second flange portion of said dash and defining an overlap distance, wherein said overlap distance is less than a distance between said outer circumferential surface of said pipe and said opening in said dash in said assembled position.

8. The mounting arrangement of claim 1, further comprising:

a second mounting plate positioned in said engine compartment and accepting said pipe through a passage therein, said passage having a clearance greater than an outer circumferential surface of said pipe wherein said pipe extends through said passage without contacting said second mounting plate in said assembled position; and a noise abating material disposed between said dash and said second mounting plate, said noise abating material contacting said outer circumferential surface of said pipe is said assembled position.

9. The mounting arrangement of claim 8 wherein a fastener is coupled between said first and second mounting plate, said fastener passing through said first noise abating material, said dash and said second noise abating material.

10. A mounting arrangement for accepting heater pipes through a vehicle dash comprising:

a dash defining a boundary between an engine compartment and a passenger compartment;

a dash mat disposed adjacent to said dash;

a pair of heater pipes extending through said dash between said engine compartment and said passenger compartment;

a first mounting plate positioned in said passenger compartment and accepting said pipes through complementary passages therein;

a second mounting plate positioned in said engine compartment and accepting said pipes through complementary passages therein;

a first noise abating material disposed between said first mounting plate and said dash, said first noise abating material overlapping a portion of said dash mat; and a second noise abating material disposed between said second mounting plate and said dash.

11. The mounting arrangement of claim 10 wherein said dash comprises:

a planar portion having said opening incorporated therein;

a first and second step portion extending from said planar portion toward said passenger compartment; and a first and second flange portion extending from said respective first and second step portion, said first and second flange portion extending away from said pipes and substantially parallel to said planar portion.

12. The mounting arrangement of claim 11 wherein said first and second step portion extend at an angle with respect to said planar portion of said dash and contact said first noise abating material on an inboard side.

13. The mounting arrangement of claim 12 wherein said pipes contact said first and second noise abating material and do not contact said dash and said first and second mounting plate in an assembled position.

14. The mounting arrangement of claim 12 wherein said first mounting plate comprises:

a planar portion having said passage incorporated therein;

a first and second step portion extending from said planar portion toward said passenger compartment; and a first and second flange portion extending from said respective first and second step portion, said first and second flange portion extending away from said pipes and overlapping a portion of said first and second flange portion of said dash and defining an overlap distance, wherein said overlap distance is less than a distance between an outer circumferential surface of said pipes and said opening in said dash in said assembled position.

15. The mounting arrangement of claim 10 wherein a fastener couples said first mounting plate to said second mounting plate, said fastener positioned between said pipes and passing through said first noise abating material, said dash and said second noise abating material.

16. A mounting arrangement for accepting heater pipes through a vehicle dash comprising:

a dash defining a boundary between an engine compartment and a passenger compartment, said dash further comprising:

an opening incorporated in a planar portion of said dash for accepting the heater pipes;

a step portion extending at an angle from said planar portion; and a flange extending from said step portion and laterally offset toward said passenger compartment;

a dash mat contacting said planar portion, said step portion and said flange portion;

a first mounting plate contacting said flange of said dash; and a noise abating material disposed between said dash and said first mounting plate, said noise abating material contacting an outer circumferential surface of the heater pipes and said step portion of said dash;

wherein said dash mat and said first noise abating material overlap at said step portion.

17. The mounting arrangement of claim 16, further comprising:

a second mounting plate positioned in said engine compartment and accepting said pipes through a passage therein, said passage having a clearance sufficient to permit said pipes to extend through said passage without contacting said second mounting plate in said installed position; and a noise abating material disposed between said dash and said second mounting plate, said noise abating material contacting pipes in said installed position.

18. The mounting arrangement of claim 17 wherein said step portion contacts said first noise abating material on an inboard side.

19. The mounting arrangement of claim 17 wherein said dash mat is disposed between said planar portion and said flange portion of said dash.

* * * * *